United States Patent
Lovegreen

(10) Patent No.: US 9,577,431 B2
(45) Date of Patent: Feb. 21, 2017

(54) CONSOLE POWER SYSTEMS

(71) Applicant: Long Range Systems, LLC, Addison, TX (US)

(72) Inventor: Kenneth James Lovegreen, Lake Kiowa, TX (US)

(73) Assignee: Long Range Systems, LLC, Addison, TX (US)

( * ) Notice: Subject to any disclaimer, the term of this patent is extended or adjusted under 35 U.S.C. 154(b) by 774 days.

(21) Appl. No.: 13/961,446

(22) Filed: Aug. 7, 2013

(65) Prior Publication Data

US 2014/0042808 A1 Feb. 13, 2014

Related U.S. Application Data

(60) Provisional application No. 61/681,012, filed on Aug. 8, 2012.

(51) Int. Cl.
*H02J 4/00* (2006.01)
*H02J 7/02* (2016.01)
*H02J 7/00* (2006.01)
*G06Q 10/02* (2012.01)

(52) U.S. Cl.
CPC .............. *H02J 4/00* (2013.01); *H02J 7/025* (2013.01); *G06Q 10/02* (2013.01); *H02J 7/0054* (2013.01); *Y10T 307/25* (2015.04)

(58) Field of Classification Search
None
See application file for complete search history.

(56) References Cited

U.S. PATENT DOCUMENTS

| | | | | |
|---|---|---|---|---|
| 7,236,087 B2* | 6/2007 | Vasquez | ................ | G06Q 10/02 320/130 |
| 7,508,162 B2* | 3/2009 | Lippojoki | ............ | H02J 7/0054 320/103 |
| 7,652,558 B2* | 1/2010 | Lovegreen | ......... | G06Q 10/0639 206/557 |
| 2003/0178967 A1* | 9/2003 | Khatri | .................. | G06F 1/3203 320/103 |
| 2005/0200455 A1* | 9/2005 | Veni, III | ............... | G06Q 50/12 340/7.55 |
| 2007/0077883 A1* | 4/2007 | Childers | ................ | H04H 20/61 455/3.05 |
| 2009/0023480 A1* | 1/2009 | Nandi | ................... | H02J 7/0054 455/573 |
| 2011/0016333 A1* | 1/2011 | Scott | ....................... | G06F 1/266 713/300 |
| 2011/0167187 A1* | 7/2011 | Crumlin | ............... | G06F 1/1626 710/303 |
| 2012/0261998 A1* | 10/2012 | Sato | ....................... | H02J 5/005 307/80 |

\* cited by examiner

*Primary Examiner* — Rexford Barnie
*Assistant Examiner* — David Shiao
(74) *Attorney, Agent, or Firm* — Kirby B. Drake; Klemchuk LLP

(57) ABSTRACT

In various implementations, a pager may be coupled to a console. The pager may include a battery and coupling the pager to the console may provide power to the console. In some implementations, the power provided to the console may charge a battery of the console and/or allow the console to perform one or more operations.

19 Claims, 3 Drawing Sheets

CONSOLE POWER SYSTEMS

CROSS-REFERENCE TO RELATED APPLICATIONS

This application claims priority to U.S. Provisional Patent Application No. 61/681,012, entitled "Console Power Systems," filed on Aug. 8, 2012, which is hereby incorporated by reference for all purposes.

TECHNICAL FIELD

The present invention relates to providing power to consoles.

BACKGROUND

Restaurants, bars, and other entertainment venues often use different types of consoles on tables. For example, consoles may include gaming systems and displays. Customers that visit the venues may interact with the consoles while visiting the restaurants.

SUMMARY

In various implementations, a pager may provide power to a console. The pager may receive notifications for a customer and/or staff (e.g., waitstaff such as bartenders, busboys, and/or managers). The pager may include a power source. A console, such as a gaming system, may include a surface to couple with the pager. The pager may provide power to the console for operation of the console.

Various implementations may include one or more of the following features. The console may be a gaming system, a remote for a television, controller for music, and/or ordering device. The battery of the console may be charged by power from the battery of the pager. The pager may include a rechargeable battery. The pager may produce a visible, audio, and/or tactile (e.g., vibrations) signal in response to receiving notifications. The pager may include a coupling member to couple to a receiving member of a console. The console and the pager may wirelessly couple.

In some implementations, a pager may be coupled to a surface of the console and operation of the console may be allowed based at least partially on the power from the pager. The battery of the console may be charged at least partially using the power of the console battery.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of this disclosure and its features, reference is now made to the following description, taken in conjunction with the accompanying drawings, in which.

Like reference symbols in the various drawings indicate like elements.

DETAILED DESCRIPTION

People (e.g., customers) visit locations such as restaurants, bars, arcades, bowling alleys, etc. The locations often face competition in attracting people to the restaurants and/or creating an enjoyable atmosphere. Restaurants, for example, may utilize consoles to create an enjoyable atmosphere for the customers. Utilizing operation(s) of the console may increase table turnover by allowing customers to pay a bill for services at a restaurant using the console. A customer may then not be restricted to waiting for waitstaff to pay a bill and leave a restaurant. Utilizing operation(s) of a console may increase up-selling, add-ons, and/or revenue. For example, a console may allow a customer to order an additional round of drinks rather than waiting for waitstaff to take a customer order. In some implementations, the console may generate a user interface to suggest menu items and/or allow a customer to order the suggested menu item through the console.

The consoles may need a power source to operate and may not be located proximate a power outlet (e.g., an AC power socket), in some implementations. In various implementations, a console may utilize the power of a pager for operation and/or to charge at least one console battery. By utilizing the power of a pager, the console may operate even when the console is not located proximate a power outlet. In some implementations, by at least reducing the need to charge the console battery in each console, operation costs for a location may be reduced (e.g., since staff may not need to charge each console battery).

Pagers may be telecommunication devices that are utilized by various locations, such as restaurants, to locate and/or notify staff and/or customers. The pagers may be distributed to staff and/or customers from one or more centralized areas and returned to the centralized area. For example, the pagers may be distributed to various staff members from a centralized location, such as a manager's area or employee time clocks. The customers may receive pagers from a hostess or reception desk. The centralized area may provide a charging system for the pagers and since the pagers are distributed and returned to the centralized area, the charging of pagers (e.g., pager batteries) may be facilitated during restaurant operation. By utilizing the pagers, which may be easily charged since they are distributed and returned to a centralized area, to charge the consoles, operations of the restaurant may be streamlined (e.g., since staff may not need to engage in separate specific activities to charge pagers and consoles) and cost savings may occur.

Figure 1:
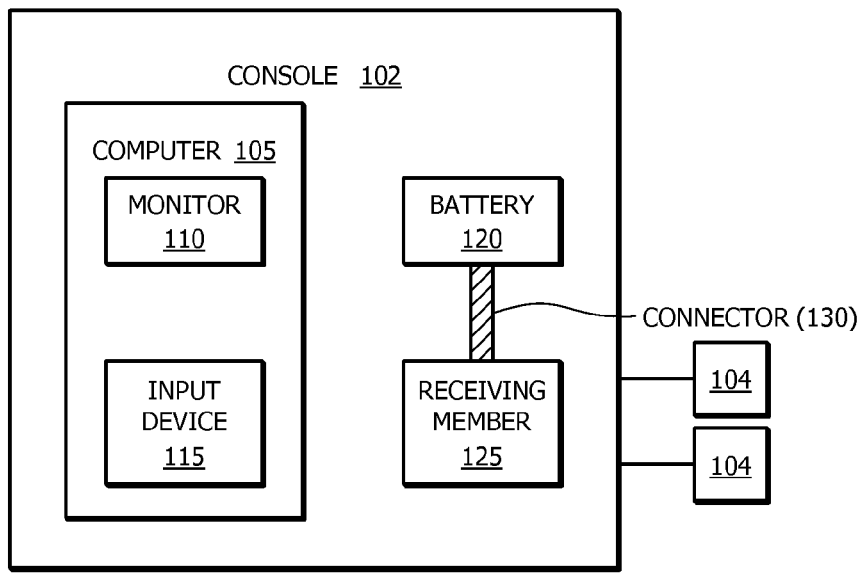
FIG. 1 illustrates an implementation of an example console system.

FIG. 1 illustrates an implementation of an example console system 100. For example, console system 100 may include a console 102 and/or supplemental devices 104, such as printers, card readers, charging stations (e.g., for smart phones) and/or code readers (e.g., bar code readers and/or QR code readers).

The console 102 may be a computer system (e.g., a tablet computer) and/or a docking station (e.g., power supply and/or coupling members) for supplemental devices. The console 102 may be a tabletop device (e.g., positioned proximate and/or on a table at a restaurant). The console 102 may allow customers to order menu items, pay the check associated with an experience (e.g., dining, games, etc.), reload game cards, take surveys, and/or participate in entertainment activities (e.g., games, control and/or watch television shows and/or movie trailers, read news articles, sign up for loyalty programs, and/or view advertisements).

As illustrated in FIG. 1, the console 102 may include a computer 105 with a monitor 110 (e.g., Liquid Crystal Display screen) and/or input device 115 (e.g., keyboard). In some implementations, the monitor 110 and the input device 115 may be combined and/or integrated (e.g., touch screen).

The console 102 may include a power source, such as a console battery 120. The console battery 120 may be a rechargeable battery. The console battery 120 may be a lithium ion battery and/or a nickel cadmium battery, in some implementations. The console battery 120 may provide power to the computer 105 so that the console may perform various operations. For example, a console system disposed on a table may not be proximate a power outlet and thus, may be restricted from being plugged into a power outlet. Providing power to each console system may thus require a console battery. The console battery may need to be replaced and/or recharged frequently (e.g., daily or more often). By utilizing a pager to provide power to the console and/or to charge the console battery, the need to replace and/or recharge the console battery through other systems and processes (e.g., charger, removing console battery and charging the battery, plugging the console into a power outlet) may be reduced. Reducing restaurant operations, such as reducing the need to install outlets at every table and/or reducing the need for staff to charge a console battery, may decrease costs for the restaurant. In some implementations, a console may not include a battery and operations of the console may be performed utilizing power from the pager.

In some implementations, operation of the console may be restricted to when a pager is coupled to the console. By restricting console operation to customers with pagers may increase sales (e.g., since customers may have to purchase services to obtain a pager) and/or decrease costs (e.g., since power is provided to consoles during use rather than also during periods of inactivity).

The console 100 may include a receiving member 125 through which the pager may be coupled to the console and/or the console battery 120 may be charged. For example, the receiving member 125 may be coupled to the console battery 125 through a connector 130 (e.g., a lead such as a wire).

In some implementations, the receiving member 125 may receive a pager and may receive power from a pager battery to be provided to the console system 100. The receiving member 125 may be a surface on which the pager is disposed to electrically couple the pager to the console. For example, the receiving member 125 may include a coupling member such as a recessed portion, groove, indentation and/or other configuration to receive at least a portion of a housing of the pager.

The receiving member 125 may include electrical connector(s) to couple with electrical connector(s) of a pager and create an electrical connection between the pager and the console 102. The console battery may be charged utilizing the electrical connection, in some implementations. The electrical connector may include electrical leads and/or other surfaces capable of creating an electrical connection, such as a Duracell PowerMat™ commercially available from Procter & Gamble (Cincinnati, Ohio).

The pagers may include various appropriate implementations of pagers, such as gaming pagers and/or coaster pagers. In some implementation, the pager may include appropriate features similar to pagers described in U.S. Pat. No. 6,573,824 entitled "Combined Paging and Gaming Apparatus and System" to Lovegreen et. al. and/or U.S. Pat. No. 5,814,968 entitled "Battery Recharger and Rechargeable Electronic Paging Device Assembly" to Lovegreen et al.

Figure 2A:
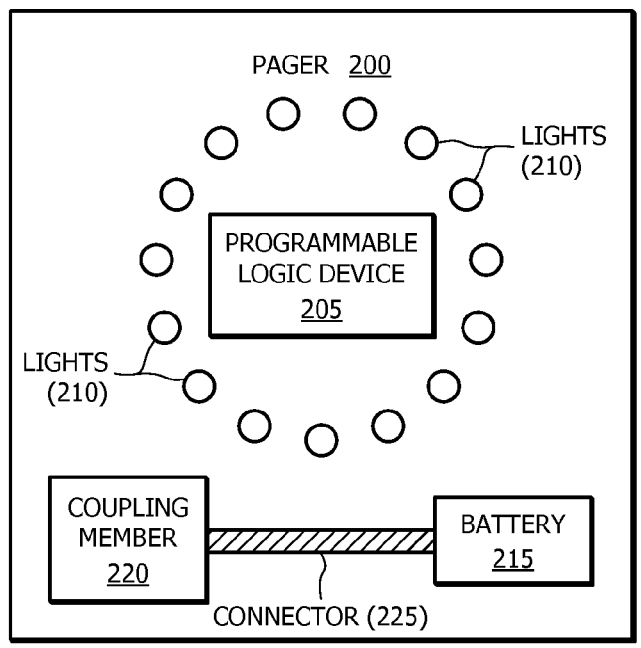
FIG. 2A illustrates a top view of an implementation of an example pager.

FIG. 2A illustrates a top view of an implementation of an example pager 200. The pager 200 may be a coaster type pager that a restaurant uses to notify users that a table is available and/or order is ready, for example. The pager 200 may include a programmable logic device 205 or any other appropriate computer system (e.g., computer and/or other telecommunication device). The programmable logic device 205 may receive signals from a restaurant management system (e.g., a point of sale system or other computer system) and transmit a signal to a notification member of the pager, such as light(s) 210 (e.g., LED lights). The pager 200 may also include other notification members, such as vibration devices, auditory signals, and/or other visual signals.

The pager 200 may include a power source, such as a pager battery 215. The pager battery 215 may be a rechargeable battery and/or replaceable battery. The pager battery 215 may be charged utilizing a charging system, similar to the system described in U.S. Pat. No. 5,814,968 entitled "Battery Recharger and Rechargeable Electronic Paging Device Assembly" to Lovegreen et al. or any other appropriate charging system.

The pager 200 may also include a coupling member 220. The coupling member 220 may be coupled to the pager battery 215 using a connector 225 (e.g., a lead such as a wire). The coupling member 220 may allow the pager 200 to be coupled to a console. For example, the coupling member 220 may couple (e.g., electrically couple) to the receiving member. The coupling member 220 of the pager 200 and/or the receiving member of the console may include various plugs and/or sockets to electrically couple together. For example, the coupling member 220 may include electrical connectors that contact at least a portion of the electrical connectors of the console to provide power to the console from the pager battery 215. In some implementations, the pager 200 may include electrical connectors for charging the pager battery 215 and at least a portion of the same electrical connectors may be utilized to electrically couple the pager to the console and/or provide power to the console.

Figure 2B:
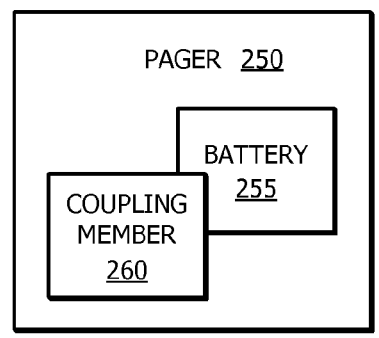
FIG. 2B illustrates a bottom view of an implementation of an example pager.

FIG. 2B illustrates a bottom view of an implementation of an example pager 250. The pager 250 may include a battery 255 and a coupling member 260 coupled to the battery. The coupling member 260 may be disposed on a bottom surface of the pager 250. For example, the coupling member 260 may include electrical leads, such as electrically conductive metal strips on a back of a pager 250.

Figure 3:
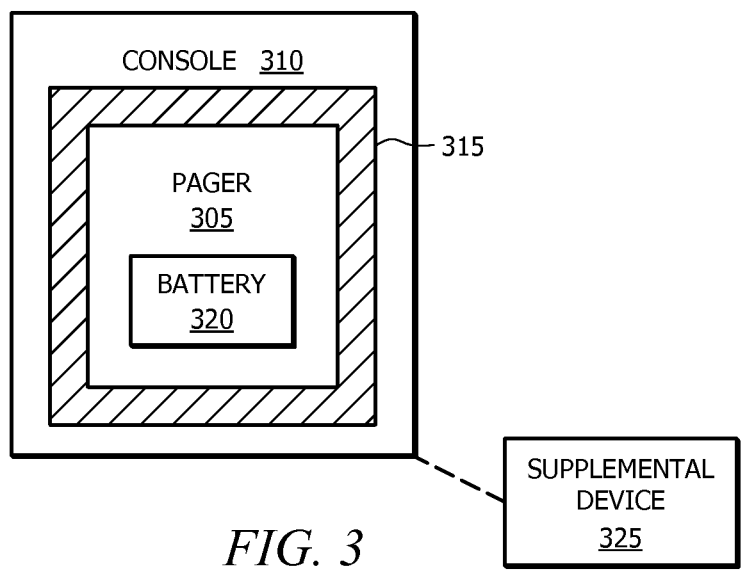
FIG. 3 illustrates an implementation of an example of a charging configuration.
Figure 4:
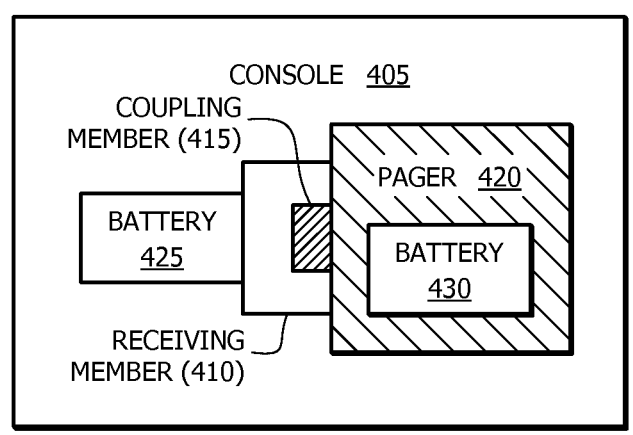
FIG. 4 illustrates an implementation of an example of a charging configuration.

Various orientations may be utilized to couple the pager to the console. FIGS. 3 and 4 illustrate implementations of example charging configurations 300, 400. As illustrated in FIG. 3, the pager 305 may be coupled to the console 310. The pager 305 may be disposed on a surface 315 of the console 310 to couple the pager 305 and the console 310. For example, a surface 315 of the console 310 may include a wireless charging surface such as a Duracell Powermat, commercially available from Procter and Gamble (Cincinnati, Ohio), that couples the console and the pager 305 such that power may be provided to the console by the pager. In some implementations, the surface 315 may include various coupling members to couple the pager 305 to the console 310.

By disposing the pager 305 at least partially on the surface of the console 310, the pager battery 320 may be coupled to the console 310. The pager battery 320 may provide power to the console 310 and/or supplemental devices 325 coupled (e.g., via a wired or wireless connection) to the console 310. The console 310 may not have a console battery and operation of the console and/or supplemental devices 325 coupled to the console may be restricted to periods of time when the pager is coupled to the console. By allowing the console to receive power from the pager, the console may operate when not plugged into a power outlet.

Although the console is described as not including a console battery in FIG. 3, a console may include a console battery. The pager battery 320 may transfer power to the console battery to charge the console battery. Thus, if the console battery is at least partially charged, the console may operate when the pager is not coupled to the console.

As illustrated in FIG. 4, the console 405 may include a receiving member 410. The receiving member may be configured to receive a coupling member 415 of the pager 420. The console battery 425 may be electrically coupled to the pager battery 430 via the receiving member 410 and/or the coupling member 415. For example, the receiving member 410 may include a recess configured to receive a protrusion of the coupling member 415. In some implementations, the receiving member 410 and the coupling member 415 may include male and/or female connectors, such that the receiving member and the coupling member may couple.

Figure 5:
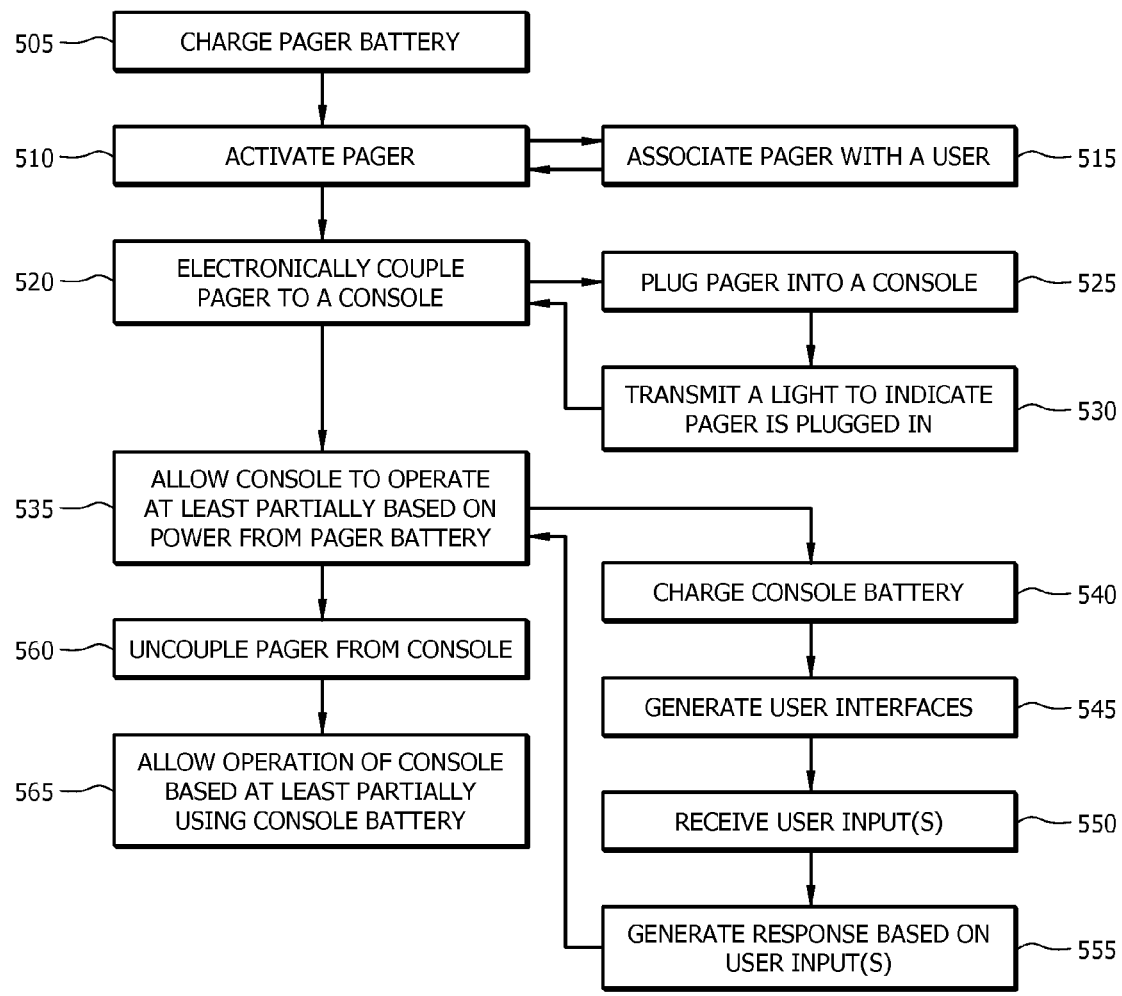
FIG. 5 illustrates an implementation of an example process for charging a console.

FIG. 5 illustrates an implementation of an example process 500 for charging and utilizing a console. A pager battery may be charged (operation 505). For example, the pager may be plugged into a charging unit that provides power to the battery and/or charges the battery. For example, the pager may be coupled to a stack of pagers and the stack of pagers may be charged.

The pager may be activated (operation 510). For example, a signal may be transmitted from a restaurant management system (e.g., a computer server that manages operations of a restaurant such as a point of sale system) to the pager. An identification number associated with the pager may be transmitted to the restaurant management system. The pager may be provided to staff and/or a customer. The pager may await a signal from the restaurant management system to present a notification to a customer and/or staff (e.g., table is ready, table needs staff attention, and/or order is ready at a counter).

The pager may be associated with a user (operation 515). For example, a pager identification code (e.g., number) may be associated with an order of the customer and/or customer identification information (e.g., name, phone number, etc.). In some implementations, a pager may be associated with a table a customer selects through an RFID (radio frequency identification) tag disposed at a table. The pager may be associated with a staff member.

The pager may be electrically coupled to a console (operation 520). For example, the customer and/or staff of the restaurant (e.g., waitstaff, hostess, and/or bartender) may couple the pager to the console.

Electrically coupling the pager to the console may include plugging the pager into the console (operation 525). For example, the console may include a recess and at least a portion of the pager may be positioned in the recess. In some implementations, a plug of a pager may be positioned in a socket of the console. The pager may include electrical leads that contact electrical leads on a console to electrically couple the pager and the console.

A light may be transmitted to indicate that a pager is plugged in (operation 530). For example, when an electrical connection is achieved between the console and the pager a light may be transmitted. The light may indicate that the console is operating and/or a console battery is charging based at least partially on the power of the pager (e.g., the pager battery).

A console may be allowed to operate at least partially based on power from the pager battery (operation 535). For example, the pager battery may charge the console battery. The pager battery may directly provide power to the console for operations (e.g., control sound through the console, play games on the console, and/or display graphical user interfaces to customers). The console may deliver power from the pager to one or more supplementary device, such as a printer to print a receipt and/or gaming tickets and/or a card reader to pay a customer's bill.

The console battery may be charged (operation 540). For example, power from the pager battery may transfer to the console battery and be stored by the console battery.

User interfaces may be generated (operation 545). For example, the console may operate and generate various user interfaces, such as menu prompts (e.g., additional drinks and/or dessert orders), interfaces related to television control, and/or games.

User input(s) may be received (operation 550). For example, when a restaurant has multiple televisions, the customer may select a sound signal associated with a television the customer would like to watch through the console. In some implementations, a customer may order menu items using the console. The customer input a signal to alert waitstaff using the console.

A response may be generated based on user input(s) (operation 555). For example, waitstaff may respond to a customer's input. An order for a kitchen of a restaurant, for example, may be placed for the customer through the console. In some implementations, a sound stream from a selected television may be delivered to speakers of the console.

The pager may be uncoupled from the console (operation 560). When a customer leaves a table, the customer may uncouple a pager. In some implementations, waitstaff may uncouple the pager from the console at a predetermined time (e.g., approximately when a customer leaves a table, approximately at the end of a shift and/or approximately at the end of an operating day).

Operation of the console may be allowed at least partially using the console battery (operation 565). For example, when a console battery has power (e.g., from charging the console battery through the pager), the console may operate (e.g., games and/or allow operation of various supplemental devices) utilizing the power in the console battery.

Process 500 may be implemented by various systems, such as system 100, 200, 300, and 400. In addition, various operations may be added, deleted, or modified. For example, operation of a console and/or supplemental devices may be restricted when the pager is not coupled to the console. For example, the console may not include a console battery and may be restricted from operating without an external power supply (e.g., power cord and/or pager battery). As another example, restricting operation of one or more of the supplemental devices may conserve power and/or allow longer operation of the console when the console is not coupled to the pager. In some implementations, the console and the pager may be coupled through a surface of the console. For example, the electrical connectors of the console may be exposed on a surface of the console. When a pager is disposed on the surface of the console, the electrical connectors of the pager may contact the exposed electrical connectors of the console. In some implementations, the console may be a stand or other docking station for operation of supplemental devices. When the pager is coupled to the console, operation of one or more supplemental devices may be allowed. In some implementations, when the console and pager are coupled, the devices may operate together. For example, the pager may operate as a controller for games displayed on the console. The console may act as a television and the pager may operate as a remote control.

Various computer systems (e.g., computers, touch screen computers, programmable logic devices, and/or servers) have been described. The computer system may include a processor that executes instructions and manipulates data to perform operations of the controller and a memory. The processor may include a programmable logic device, a microprocessor, or any other appropriate device for manipulating information in a logical manner and memory may include any appropriate form(s) of volatile and/or nonvolatile memory, such as a repository.

A memory may include data, such as pager identification information, customer identification information and/or any other data useful to the operation of the console and/or other computer system. In addition, various types of software may be stored on the memory. For example, instructions (e.g., operating systems and/or other types of software) and/or an operation module may be stored on the memory. The operation module may operate the console (e.g., generate graphical user interfaces, receive input from users, generate appropriate responses based on user inputs, and/or allow operation of supplemental devices) and/or other portions of the restaurant (e.g., pager systems and/or point of sale systems).

A communication interface may allow the computer system to communicate with components of the various systems (e.g., console system, supplemental devices, pagers, and/or other systems associated with the restaurant), other repositories, and/or other computer systems. The communication interface may transmit data from the computer system and/or receive data from other components, other repositories, and/or other computer systems via network protocols (e.g., TCP/IP, Bluetooth, and/or Wi-Fi) and/or a bus (e.g., serial, parallel, USB, and/or FireWire).

The computer system may include a presentation interface to present data to a user. For example, to provide for interaction with a user (e.g., staff and/or customers), the systems and techniques described here can be implemented on a computer having a display device (e.g., a CRT (cathode ray tube) or LCD (liquid crystal display) monitor) for displaying information to the user and a keyboard and a pointing device (e.g., a mouse or a track pad) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The computer systems may include clients and servers. A client and server are generally remote from each other and typically interact through a communication network. The relationship of client and server arises by virtue of computer programs running on the respective computers and having a client-server relationship to each other.

A client may allow a user (e.g., staff and/or customers) to access the computer system and/or instructions stored on the computer systems. The client may be a computer system such as a personal computer, a laptop, a personal digital assistant, a smart phone, or any computer system appropriate for communicating with the controller.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although the console illustrated in various implementations includes a battery, any appropriate power source may be utilized.

Although in a restaurant has been described, the described systems, processes, and/or portions thereof may be utilized in other locations, such as bars and/or other types of entertainment venues (e.g., arcades, bowling alleys, and/or movie theaters). In addition, other locations that utilize pagers may implement similar systems, processes and/or portions thereof. For example, urgent care clinics may issue pagers to patients that notify patients when a health care worker can meet the patient. The patient may couple the pager to a console and access console features while waiting to meet with the healthcare worker. A pharmacy retail store may issue pagers to customers waiting for prescriptions. The customer may couple a pager to a console while waiting for prescriptions. An airport and/or airline may issue pagers to customers waiting for flights. The customer may couple the pager to a console to access console operations and/or power supplemental devices that belong to the user (e.g., use the console to provide power for a laptop).

Although various people (e.g., customers, waitstaff, and/or manager) have been described as a human, a user may be a person, a group of people, a person or persons interacting with one or more computers, and/or a computer system. Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to a storage system (e.g., repository), at least one input device, and at least one output device.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a battery" includes a combination of two or more batteries and reference to "a console" includes different types and/or combinations of consoles. As another example, "coupling"

includes direct and/or indirect coupling of members. For example, a battery may be directly coupled to a coupling member. A console and pager may be wirelessly coupled together, such that the console and the pager are electrically coupled, in some implementations.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A system comprising:
a console configured to receive power during a period of use, wherein the console includes a computer system provided to present data to users; and
a pager configured to provide power to the console during the period of use, wherein the pager includes a telecommunication device provided to notify and locate users, wherein the pager couples to the console, and wherein power is provided to the console from the pager via a wired connection and via a wireless connection;
wherein the pager comprises one of a gaming pager configured to allow users to play games on the console or a coaster pager configured to provide notifications to users,
wherein the pager is associated with a user by utilizing an identifier, and
wherein the pager includes a programmable logic device that receives signals from another computer system to notify users.

2. The system of claim 1:
wherein a pager battery of the pager provides power to the console,
wherein a console battery remains in the console during recharging of the console, and
wherein the console is not plugged into a power outlet during recharging of the console.

3. The system of claim 2:
wherein the pager battery is rechargeable.

4. The system of claim 1:
wherein operation of the console is restricted to when the pager is coupled to the console.

5. The system of claim 1:
wherein the pager charges a console battery and the console charges simultaneously with the pager.

6. The system of claim 5:
wherein the console is operable when the pager is not coupled to the console.

7. The system of claim 1:
wherein the console comprises a receiving member for coupling to the pager.

8. The system of claim 7:
wherein the pager comprises a coupling member that couples to the receiving member, and
wherein electrical connectors of the coupling member contact at least a portion of additional electrical connectors of the console.

9. The system of claim 7:
wherein the receiving member comprises a surface on which the pager is disposed.

10. The system of claim 9:
wherein the pager and the console couple wirelessly.

11. The system of claim 1, the system further comprising:
one or more supplemental devices coupled to the console;
wherein the pager provides power to at least one of the supplemental devices.

12. The system of claim 11:
wherein at least one of the supplemental devices couples to the console wirelessly.

13. A system comprising:
a console comprising a computer system adapted to receive power from a console battery, a pager, or both during a period of use, wherein the console includes the computer system provided to present data to users; and
a pager comprising a telecommunication device adapted to provide power to the console battery, the console, or both during the period of use,
wherein the pager notifies and locates users,
wherein the pager electrically couples to the console, the console battery, or both, and
wherein power is provided to the console from the pager via a wired connection and via a wireless connection;
wherein the pager comprises one of a gaming pager configured to allow users to play games on the console or a coaster pager configured to provide notifications to users,
wherein the pager is associated with a user by utilizing an identifier, and
wherein the pager includes a programmable logic device that receives signals from another computer system to notify users.

14. A method for charging and operating a console comprising a computer system provided to present data to users, the method comprising:
coupling a pager comprising a telecommunication device provided to notify and locate users to the console to provide power to the console from the pager by utilizing electrical connectors of a coupling member to contact at least a portion of additional electrical connectors of the console and via a wireless connection;
wherein the pager comprises one of a gaming pager configured to allow users to play games on the console or a coaster pager configured to provide notifications to users,
wherein the pager is associated with a user by utilizing an identifier, and
wherein the pager includes a programmable logic device that receives signals from another computer system to notify users.

15. The method of claim 14, further comprising:
charging a battery of the console with power from the pager, wherein the console charges simultaneously with the pager.

16. The method of claim 14, further comprising:
allowing at least partial operation of the console based on power from the pager even when the pager is not coupled to the console.

17. The method of claim 14, further comprising:
charging a battery of the pager before electrically coupling the pager to the console.

18. The method of claim 14, further comprising:
activating the pager; and
associating the pager with a user before electrically coupling the pager to the console.

19. The method of claim 14, further comprising:
delivering power from the pager to at least one supplementary device coupled to the console.

* * * * *